US012249770B2

(12) United States Patent
Liu et al.

(10) Patent No.: US 12,249,770 B2
(45) Date of Patent: Mar. 11, 2025

(54) ROTATABLE ANTENNAS

(71) Applicant: Hewlett-Packard Development Company, L.P., Spring, TX (US)

(72) Inventors: Chun-Chih Liu, Taipei (TW); Cheng-Ming Lin, Taipei (TW); Ren-Hao Chen, Taipei (TW); Chia Hung Kuo, Taipei (TW)

(73) Assignee: Hewlett-Packard Development Company, L.P., Spring, TX (US)

(*) Notice: Subject to any disclaimer, the term of this patent is extended or adjusted under 35 U.S.C. 154(b) by 100 days.

(21) Appl. No.: 18/043,003

(22) PCT Filed: Oct. 15, 2020

(86) PCT No.: PCT/US2020/055705
§ 371 (c)(1),
(2) Date: Feb. 24, 2023

(87) PCT Pub. No.: WO2022/081155
PCT Pub. Date: Apr. 21, 2022

(65) Prior Publication Data

US 2023/0307828 A1 Sep. 28, 2023

(51) Int. Cl.
*H01Q 3/04* (2006.01)
*H01Q 1/22* (2006.01)
*H01Q 9/04* (2006.01)

(52) U.S. Cl.
CPC ............. *H01Q 3/04* (2013.01); *H01Q 1/2266* (2013.01); *H01Q 9/0457* (2013.01); *H01Q 9/0471* (2013.01)

(58) Field of Classification Search
CPC .......... H01Q 1/2266; H01Q 3/02; H01Q 3/04; H01Q 3/06; H01Q 9/0457; H01Q 9/0471
See application file for complete search history.

(56) References Cited

U.S. PATENT DOCUMENTS

| | | | | |
|---|---|---|---|---|
| 6,388,627 | B1 | 5/2002 | Masaki et al. | |
| 6,654,231 | B2 | 11/2003 | Teshima | |
| 6,853,336 | B2 | 2/2005 | Asano et al. | |
| 7,009,568 | B2 | 3/2006 | Amemiya et al. | |
| 2006/0287126 | A1* | 12/2006 | Aisenbrey .............. | A63B 71/10 473/316 |
| 2017/0069953 | A1* | 3/2017 | Wong ........................ | H01Q 3/06 |
| 2017/0117611 | A1 | 4/2017 | Lepe et al. | |
| 2019/0305403 | A1 | 10/2019 | Wang et al. | |
| 2023/0198122 | A1* | 6/2023 | Tamrakar ................. | H01Q 3/04 455/575.7 |
| 2024/0322419 | A1* | 9/2024 | Lim ....................... | H01Q 21/08 |

FOREIGN PATENT DOCUMENTS

| | | | |
|---|---|---|---|
| CN | 2766357 | Y | 3/2006 |
| CN | 108390155 | A | 8/2018 |
| FR | 2151753 | A5 | 4/1973 |

* cited by examiner

*Primary Examiner* — Dameon E Levi
*Assistant Examiner* — Leah Rosenberg
(74) *Attorney, Agent, or Firm* — Knobbe, Martens, Olson & Bear, LLP

(57) ABSTRACT

In one example in accordance with the present disclosure, an example computing device is disclosed. The example computing device includes a housing. The example computing device also includes a rotatable antenna disposed within the housing. The rotatable antenna is to rotate such that a direction of radiation is maintained in a single direction as the housing is to rotate.

9 Claims, 13 Drawing Sheets

ROTATABLE ANTENNAS

BACKGROUND

Computing devices include wireless antennas to transmit information between electronic devices that are not physically connected to one another. Antennas wirelessly communicate with other antennas through a wireless network. Different wireless networks include different communication protocols and the antennas that are a part of a wireless network communicate in compliance with those protocols. One example of a wireless network is a wireless local area network (WLAN). Another example of a wireless network is a global positioning system (GPS) network. A computing device includes a respective antenna for each wireless network through which it communicates. For example, an electronic device with a Wi-Fi antenna may transmit and receive data via the Wi-Fi network. If the electronic device includes a GPS antenna it may also communicate via a GPS network.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
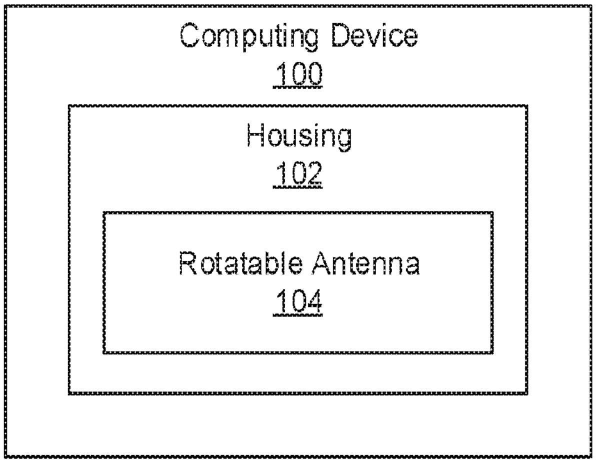
FIG. 1 is a block diagram of a computing device with a rotatable antenna, according to an example.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Computing devices include any number of antennas to facilitate wireless communication. For example, a computing device may include a Wi-Fi antenna which allows the electronic device to transmit and receive information via a Wi-Fi network. As another example, the computing device may include an LTE antenna that allows the computing device to transmit and receive information via an LTE network. As yet another example, the computing device may include a global positioning system (GPS) antenna to determine, transmit, and receive position information for the computing device and other computing devices.

While wireless communication has undoubtedly shaped the way in which society communicates with one another, some characteristics limit their more thorough implementation. For example, to increase network coverage, access points, base stations, and GPS satellites are generally placed at high elevation positions above electronic device users. Accordingly, to increase signal strength, a computing device antenna may be pointed in a generally upward direction. However, antennas in computing devices may be static, meaning that they don't move relative to the computing device in which it is housed. Accordingly, as the orientation of the computing device changes, it may be the case that an antenna is directed in a sub-optimal direction for communication with the receiving device, i.e., access point, base station, and/or GPS satellite, which communicates with the antenna.

Take for example, a laptop computing device. The orientation of the antenna may be different when the laptop is in an open mode as compared to when the laptop is in a tablet mode. Accordingly, antenna position may be selected for maximum radiation when in one particular position. However, the computing device and antenna may be operated in a variety of other positions. While in any of these other positions, the antenna may be pointed in a sub-optimal direction for which wireless performance is compromised. Accordingly, the present specification describes computing devices with antennas that ensure a desired position of the antenna, even as the computing device is moved between different positions.

Specifically, the present specification describes a computing device with a housing and a rotatable antenna disposed within the housing. The rotatable antenna is to rotate such that a direction of radiation for the rotatable antenna is maintained in a single direction as the housing rotates.

In another example, the computing device includes the housing and the rotatable housing disposed within the housing. As before, in this example, the rotatable antenna is to rotate such that a direction of radiation is maintained in a single direction as the housing rotates. In this example, a weighted portion of the rotatable antenna maintains the direction of radiation in the single direction as the housing rotates.

In another example, the computing device includes the housing and the rotatable housing disposed within the housing. In this example, the rotatable antenna is magnetic. A magnet disposed in the housing is to rotate the rotatable antenna when the rotatable antenna is within a magnetic field of the magnet.

As used in the present specification and in the appended claims, the term "normal" as in a normal direction refers to a direction that is perpendicular to a surface at a given point. For example, the normal direction from a conductive pattern refers to a direction that is perpendicular from the surface of the conductive pattern.

Turning now to the figures, FIG. 1 is a block diagram of a computing device 100 with a rotatable antenna 104, according to an example. The computing device 100 may be of a variety of types including a desktop computer, a laptop computer, a tablet, a smart phone, or any other computing device 100 that wirelessly communicate with other computing or electronic devices.

The computing device 100 includes a housing 102 that houses the various components of the computing device 100. In some examples, the housing 102 may include a hinge. For example, the computing device 100 may be a laptop computer with an upper half to house a display device and a bottom half to house an input device such as a keyboard and/or a touch sensitive surface.

The computing device 100 also includes a rotatable antenna 104 that is disposed within the housing 102. That is, the rotatable antenna 104 is not external to the housing 102 and connected via a port, but is rather integrated with the housing 102. In one particular example, the rotatable antenna 104 is disposed entirely within the housing 102 of the computing device 100.

As described above, the rotatable antenna 104 allows the computing device 100 to wirelessly communicate with other devices. As such, the rotatable antenna 104 is associated with a direction of radiation. The direction of radiation refers to the direction from which radio frequency (RF) signals are emitted from the rotatable antenna 104. In general, this direction of radiation is normal to a radiating portion of the rotatable antenna 104. The direction of radiation is maintained in desired directions via the rotatable antenna 104. For example, the direction of radiation may be maintained in an upward direction, which may be a desired direction for communication with receiving devices such as an access point, a base station, or a GPS satellite. In an example, the upward direction may refer to a direction away from a surface of the earth, or opposite the force of gravity. In another example, the direction of radiation may be maintained away from the housing 102. For example, if an antenna 104 is disposed in a base of a laptop computing device and the laptop is shut, an upwardly pointing antenna 104 may experience signal degradation due to the impedance of transmission via the lid of the laptop blocking the antenna. Accordingly, the rotatable antenna 104 is to rotate such that a direction of radiation is maintained in a desired direction, and in some examples a single direction, as the housing 102 rotates.

The rotatable antenna 104 may be any variety of types, wherein a type indicates a wireless network that the rotatable antenna 104 is associated with. For example, the rotatable antenna 104 may be a Wi-Fi antenna, an LTE antenna, a wireless wide area network (WWAN) antenna, a wireless local area network (WLAN) antenna, or a GPS antenna. While particular reference is made to specific types of antenna, the rotatable antenna 104 may be of any of a variety of types to communicate via any number of wireless networks. Moreover, while the computing device 100 is depicted with a single rotatable antenna 104, the computing device 100 may include multiple rotatable antennas 104 disposed within the housing 102 such that the computing device 100 may communicate via a variety of wireless protocols.

Figure 2:
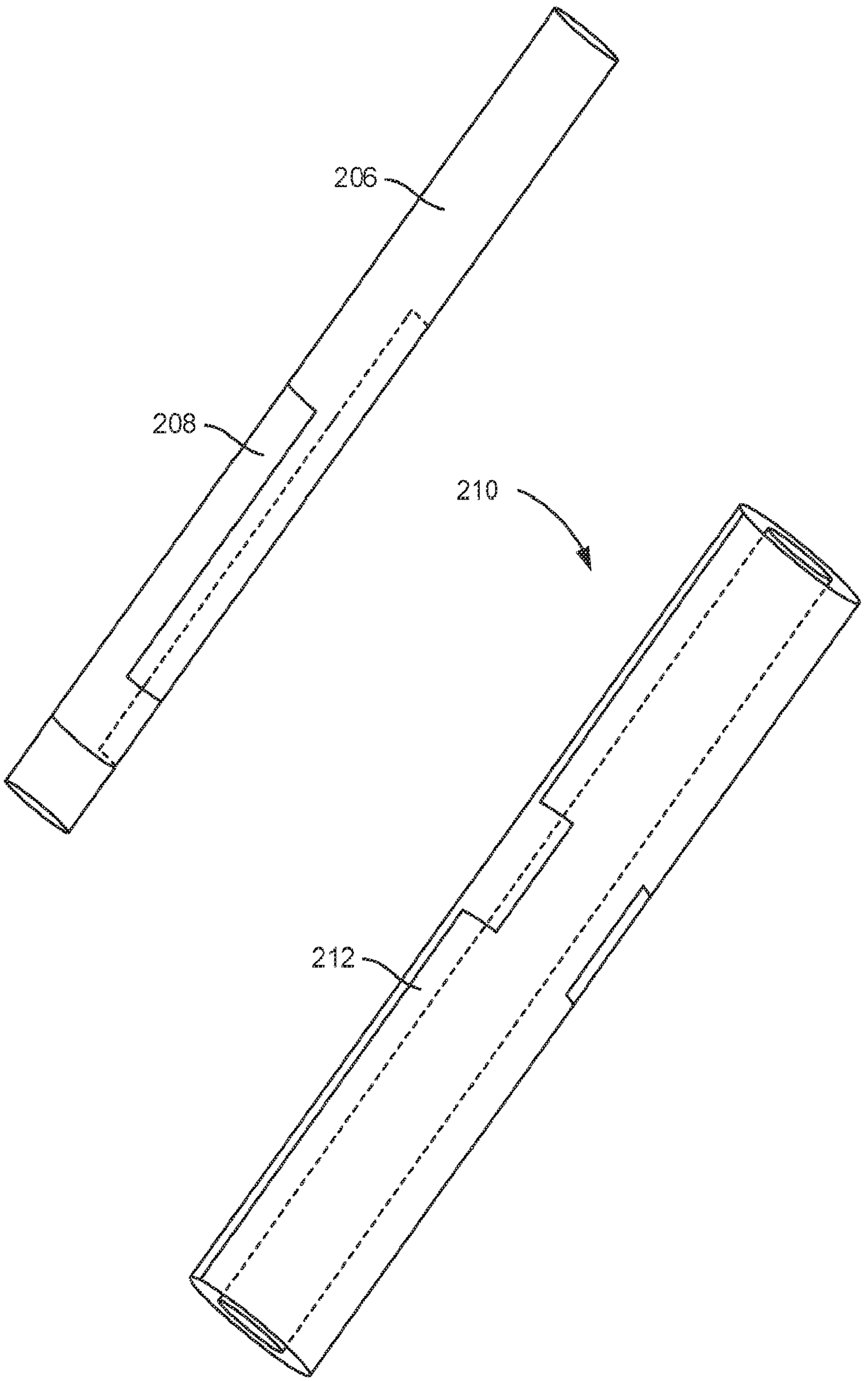
FIG. 2 is an exploded diagram of a rotatable antenna, according to an example.

FIG. 2 is an exploded diagram of a rotatable antenna 104, according to an example. In an example, the rotatable antenna 104 includes an inner rod 206 with an excitation source 208 patterned thereon. The excitation source 208 may be a pattern of conductive material that couples the energy to the rotatable antenna 104. The inner rod 206 may be a plastic body such as acrylonitrile butadiene styrene (ABS) plastic doped with a metallic compound. In this example, the excitation source 208 may be formed via laser direct structuring (LDS) of the plastic inner rod 206 body. In this example, a laser may transfer the excitation source 208 pattern directly onto the molded inner rod 206 body. That is, the material of the inner rod 206 may be ABS plastic doped with a conductive material. Where the laser beam hits the surface of the inner rod 206, the metal additive forms the excitation source 208 pattern.

Surrounding the inner rod 206 is an outer shell 210. The outer shell 210 includes a conductive pattern 212 formed on the outside surface of the outer shell 210. The conductive pattern 212 may be a radiator for the rotatable antenna 104. Radio frequency waves are emitted normal, that is perpendicular and away, from this conductive pattern 212. That is, a maximum antenna radiation is in a direction normal to the conductive pattern 212. Similar to the inner rod, the outer shell 210 may be a plastic body such as ABS plastic doped with a metallic compound. In this example, the conductive pattern 212 may be formed via laser direct structuring (LDS) on the outer shell 210 body. In this example, a laser may transfer the conductive pattern 212 directly onto the molded outer shell 210 body. That is, the material of the outer shell 210 may be ABS plastic doped with a conductive material. Specifically, where the laser beam hits the plastic, the metal additive forms the conductive pattern 212. As depicted in FIG. 2, the conductive pattern 212 may include an inset to increase impedance for better matching with the excitation source 208 and for energy coupling.

Figure 4:
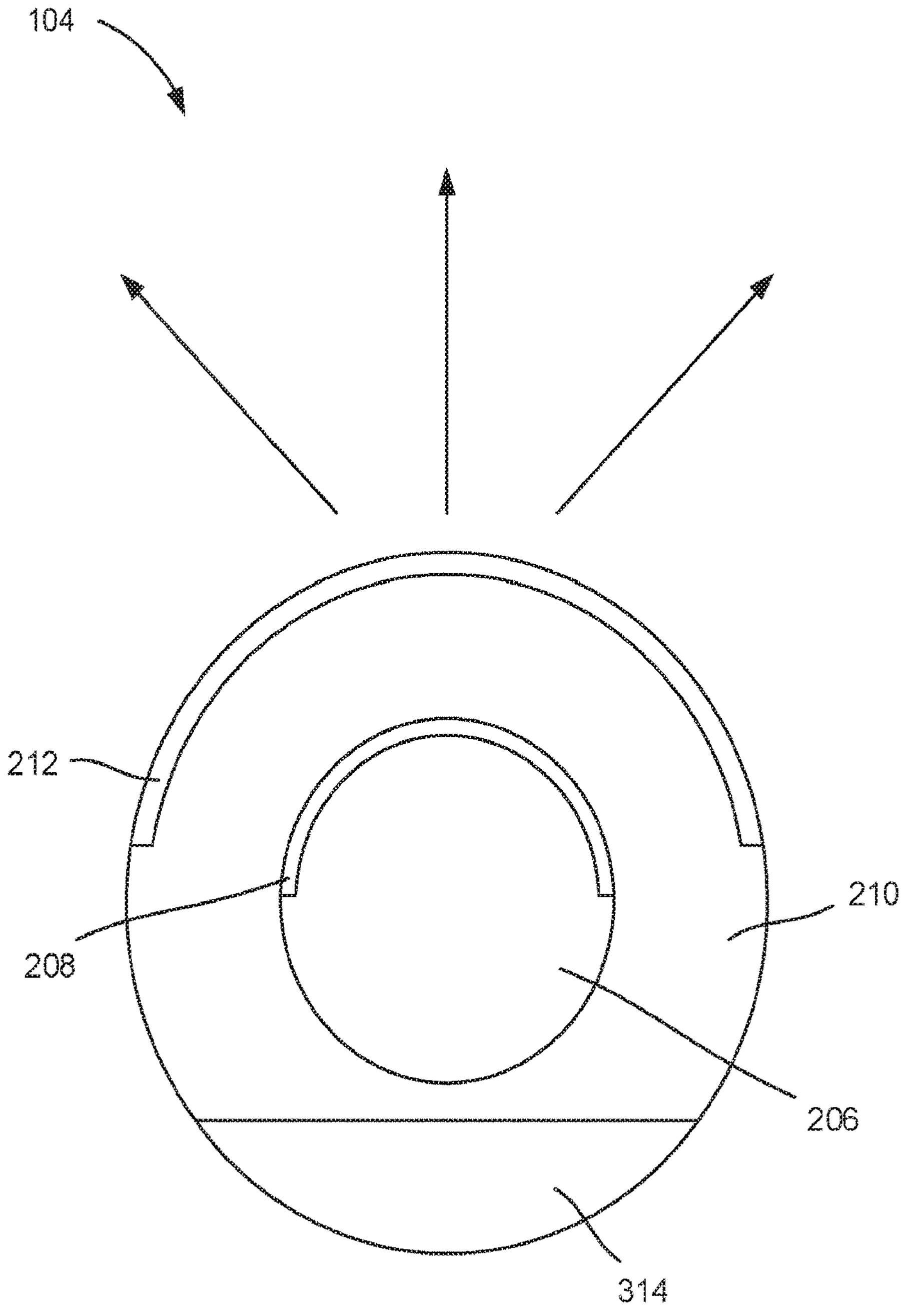
FIG. 4 is an end view of a rotatable antenna with a weighted portion, according to an example.

As depicted in FIG. 4 below, the outer shell 210 may rotate freely about the inner rod 206. Accordingly, the rotatable antenna 104 may be coupled to the housing 102 via a fixture that rigidly attaches to the inner rod 206 of the rotatable antenna 104. Accordingly, as the housing 102 rotates, the inner rod 206 is stationary relative to the housing 102, but the outer shell 210 may rotate. An example of this motion is depicted in FIGS. 6A-6D and 10A-10E.

FIG. 2 depicts an example WLAN antenna. The excitation source 208 on the inner rod 206 has two arms to provide dual resonant modes for a 5 gigahertz (GHz) high band the conductive pattern 212 on the outer shell 210 is utilized for a 2 GHz low band. While particular reference is made to a WLAN antenna, any type of antenna may be used which includes a conductive pattern 212 that rotates relative to a position of the housing 102 and a stationary inner component.

Figure 3:
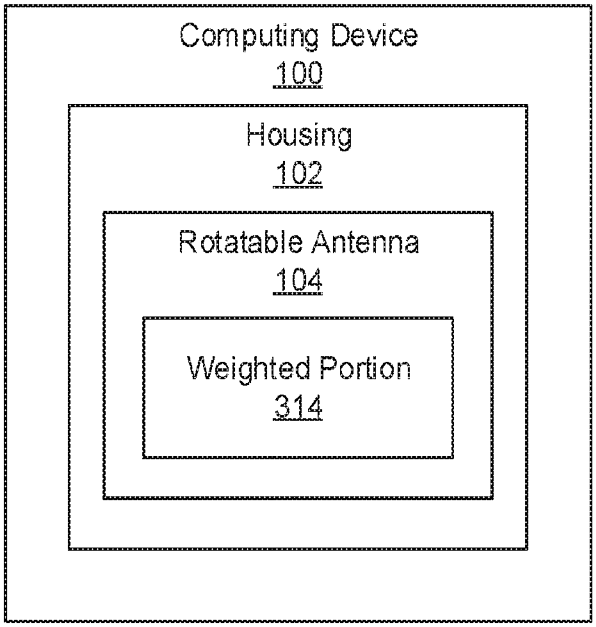
FIG. 3 is a block diagram of a computing device with a rotatable antenna with a weighted portion, according to an example.

FIG. 3 is a block diagram of a computing device 100 with a rotatable antenna 104 with a weighted portion 314, according to an example. Specifically, the computing device 100 includes the housing 102 and rotatable antenna 104 as described above. In this example, the rotatable antenna 104 includes a weighted portion 314 to maintain the direction of radiation in the single direction as the housing 102 rotates.

That is, in this example, the rotatable antenna 104 directs the direction of radiation upward for those scenarios where a desired transmitting and receiving is upward, for example, when transmitting and receiving from base stations, access points, and GPS satellites which may be higher in elevation than the computing device 100. That is, to provide enhanced coverage, receiving devices such as base stations and access points may be placed at higher positions. Accordingly, to enhance the communication with these highly positioned receiving devices, it may be desirable to maintain the direction of radiation upward. To have the direction of radiation facing these high elevation positions, the rotatable antenna 104 may have different weight distributions. For example, a weighted portion 314 of the outer shell 210 may be heavier than other portions of the outer shell. Accordingly, when the computing device 100 rotates, the outer shell 210 rotates relative to the computing device 100 housing 102 due to the force of gravity pulling the weighted portion 314 down. As depicted in FIGS. 6A-6D, such a weighted portion 314 ensures that the conductive pattern 212 and its radiation are directed upwards as the computing device 100 goes from a closed mode, through an open mode, and into a tablet mode. As such, the rotatable antenna 104 enhances antenna performance regardless of a position of the housing 102 of the computing device 100.

FIG. 4 is an end view of a rotatable antenna 104 with a weighted portion 314, according to an example. FIG. 4 clearly depicts the inner rod 206 with the excitation source 208 patterned thereon as well as the outer shell 210 with the conductive pattern 212 thereon. As described above, the direction of radiation may be normal to the conductive pattern 212 formed on the outer shell 210. Accordingly, in this example the weighted portion 314 may be formed in the outer shell 210, which outer shell 210 rotates freely about the inner rod 206. The weighted portion 314 may also be formed on an opposite surface of the outer shell 210 from the RF emitting conductive pattern 212. Accordingly, in this example, the force of gravity will act to draw the weighted portion 314 of the outer shell 210 while the conductive pattern 212 is maintained facing an upward direction.

The weighted portion 314 may be formed in any variety of ways. For example, the weighted portion 314 may be doped with a metal material that is heavier than remaining portions of the outer shell 210. Such a material may be metallic and may be selected so as to not interfere with the antenna signal transmission. In this example, the outer shell 210 may be formed by a dual-injection molded process. During one process, an ABS material doped with the heavier material to form the weighted portion 314 is injected into a mold, followed by injection of a less densely doped ABS for remaining portions of the outer shell 210.

In another example, material of the weighted portion 314 is a different material than remaining portions of the rotatable antenna 104. That is, rather than injecting ABS doped with the heavier material, the heavier material itself may be injected into a mold, followed by injection of the conductive material-infused ABS which forms the remaining portions of the outer shell 210 and from which the conductive pattern 212 is formed.

Figure 5:
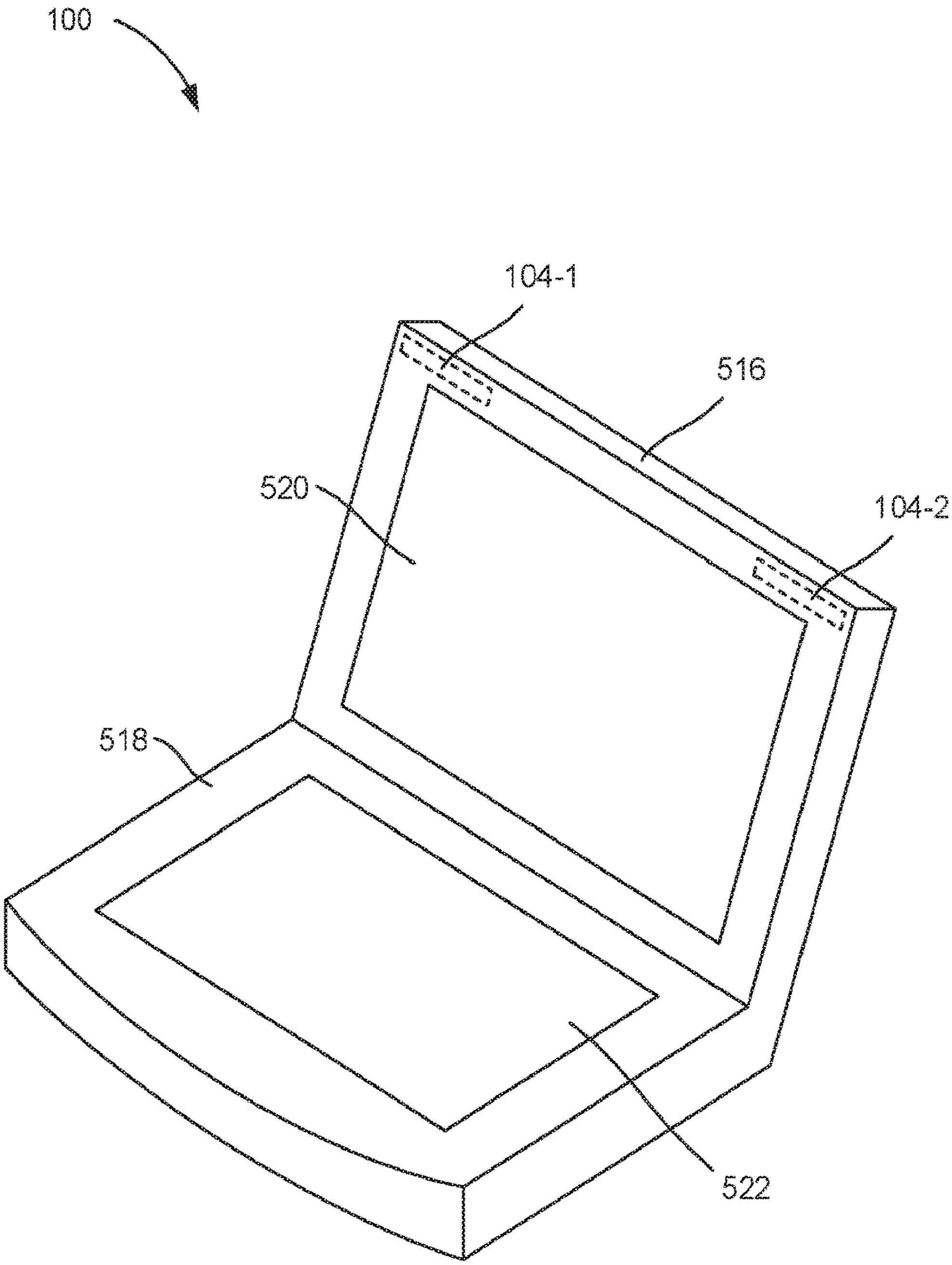
FIG. 5 is an isometric view of a computing device with a rotatable antenna, according to an example.

FIG. 5 is an isometric view of a computing device 100 with a rotatable antenna 104, according to an example. Specifically, FIG. 5 depicts an example where the housing 102 includes a bottom half 518 to house an input device 522 such as a keyboard and/or a touch sensitive surface. In this example, the housing 102 also includes an upper half 516 to house a display device 520.

In this example, the rotatable antennas 104-1, 104-2 may be disposed in the upper half 516 of the housing 102. Note that while FIG. 5 depicts two rotatable antennas 104-1, 104-2, the computing device 100 may include any number of rotatable antennas 104 positioned at other locations within the computing device 100 housing 102.

As described above, the rotatable antennas 104 may be disposed within the housing 102. In FIG. 5, this is depicted by the rotatable antennas 104 being depicted in dashed lines indicating their position internal to the upper half 516 of the housing 102. The rotatable antennas 104 may be coupled to the housing 102 via a rigid fixture. That is, the rotatable antenna 104 may be coupled to the housing 102 via a fixture rigidly coupled to the housing 102 and the inner rod 206. In an example, a fixture, such as clamps or a shaped opening, may receive the ends of the inner rod 206 of the rotatable antenna 104. Accordingly, the inner rod 206 may remain stationary relative to the housing 102. However, as described above, the outer shell 210 may rotate freely about the inner rod 206. Accordingly, the outer shell 210 may be in a different orientation relative to the inner rod 206 and housing 102. Specifically, the weighted portion 314 of the rotatable antenna 104 may maintain the direction of radiation in the single direction as the upper half 516 of the housing 102 rotates. FIGS. 6A-6D depict the rotation of the upper half 516 of the housing 102 and the maintained radiation direction of the rotatable antenna 104.

Figure 6A:
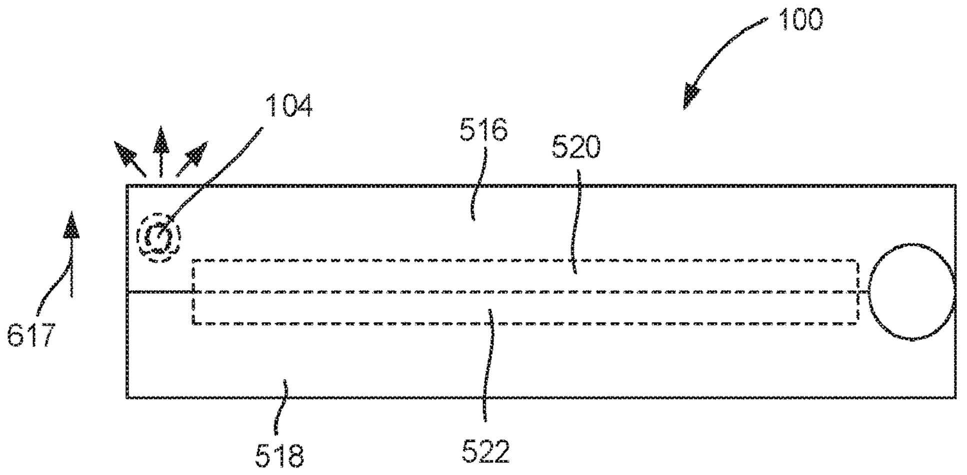
FIGS. 6A-6D depict a computing device with a rotatable antenna in various stages of rotation, according to an example.
Figure 6B:
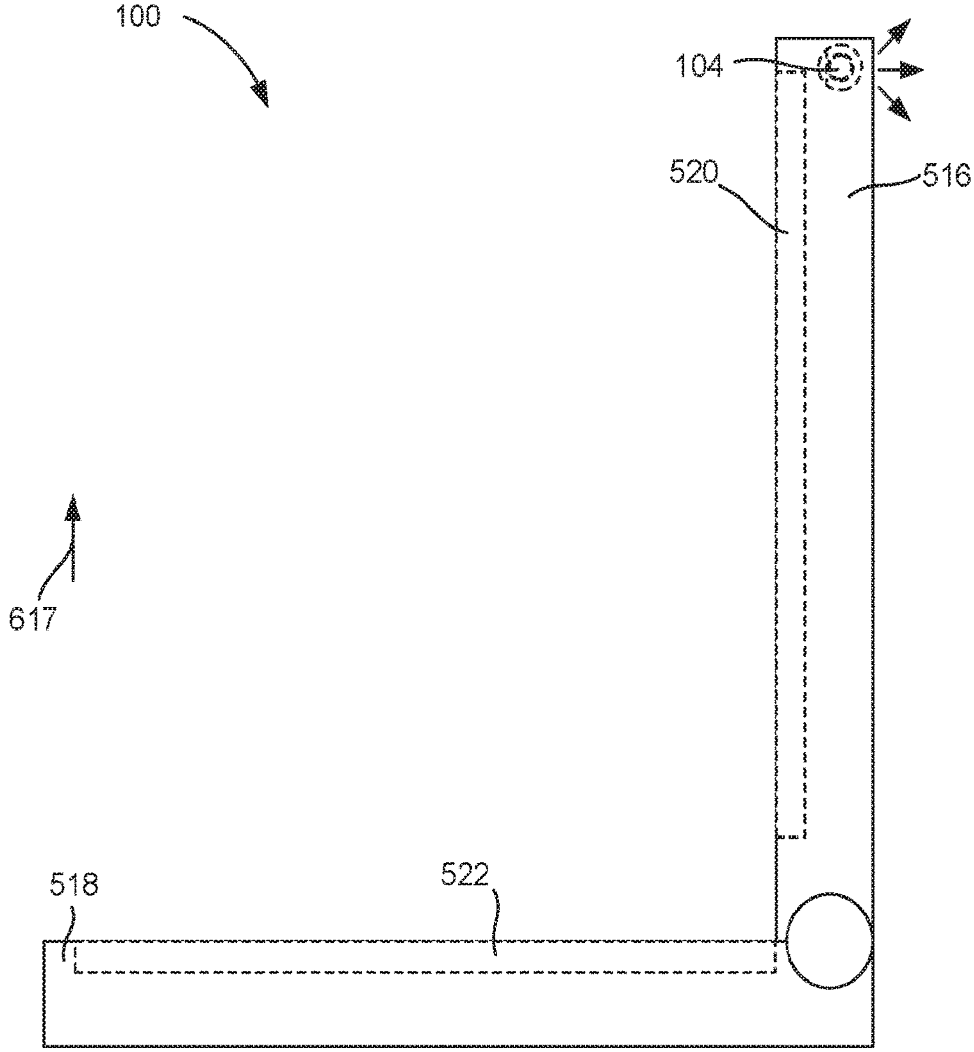
Figure 6C:
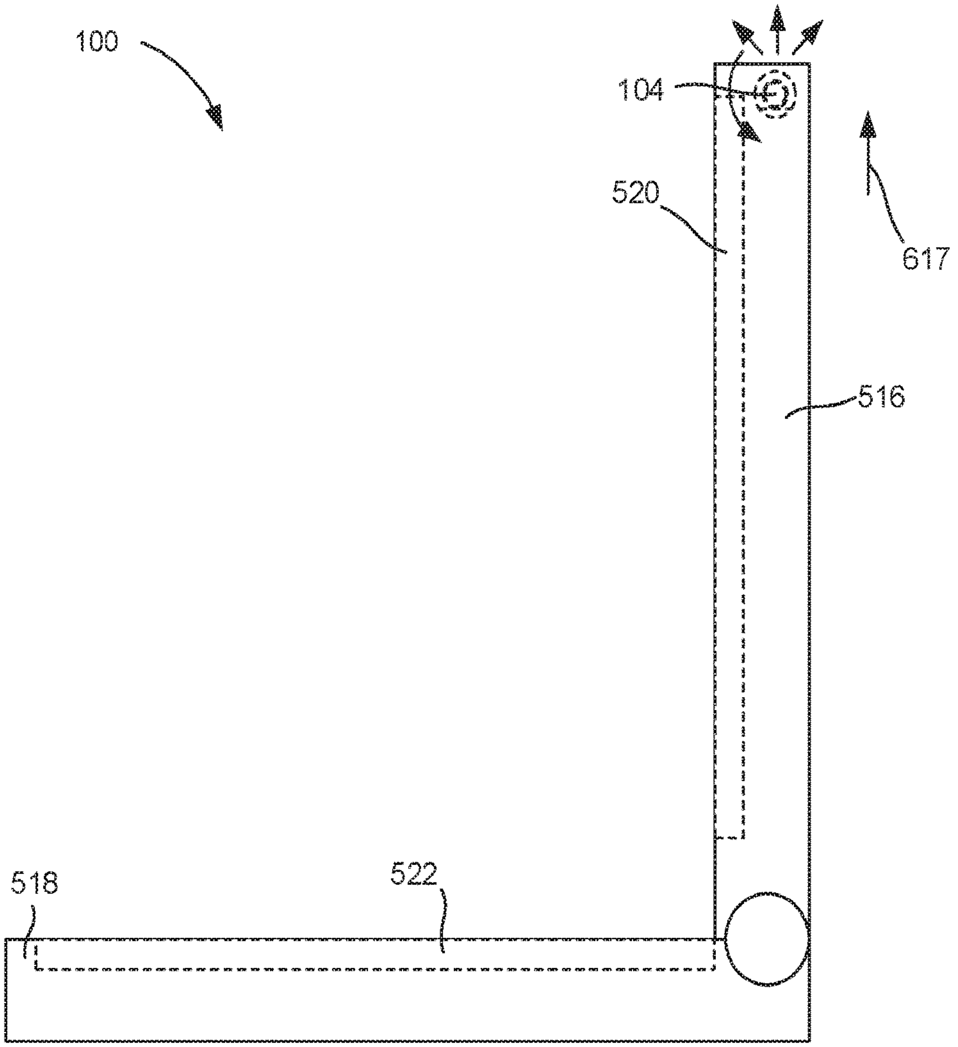
Figure 6D:
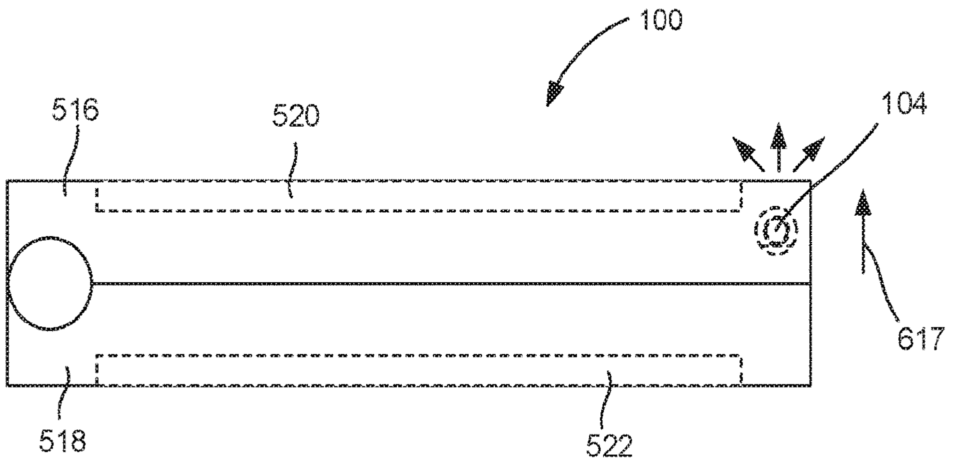

FIGS. 6A-6D depict a computing device 100 with a rotatable antenna 104 in various stages of rotation, according to an example. That is, the computing device 100 may be rotatable about a hinge to be in different operating positions. Specifically, FIG. 6A depicts the computing device 100 in a closed position where the display device 520 and input device 522 are facing one another, FIGS. 6B and 6C depict the computing device 100 in an open position, and FIG. 6D depicts the computing device 100 in a tablet position where the display device 520 and the input device 522 are facing away from one another. The rotatable antenna 104 in this example is maintained such that the direction of radiation, as indicated by the radiating arrows, is pointed upward as indicated by the arrow 617, so as to have a desired direction for communication with the receiving device, which as described above may generally be at a higher elevation than the computing device 100.

Specifically, as depicted in FIG. 6A, when the computing device 100 is in a closed position, the weighted portion 314 of the antenna is drawn down by the force of gravity. The conductive pattern 212 of the outer shell 210 being on an opposite side of the outer shell 210 is thereby directed upward such that the direction of radiation is also upward as indicated by the arrow 617.

As depicted in FIG. 6B, a user may open the computing device 100 for use. In this example, were the antenna not rotatable, but fixed relative to a position of the housing 102, the direction of radiation may be horizontal, which may be a sub-optimal direction for communication. However, as depicted in FIG. 6C, the operation of gravity draws the weighted portion 314 down, such that the rotatable antenna 104 rotates. In this example, as with the example depicted in FIG. 6A, the conductive pattern 212 of the outer shell 210 being on the opposite side of the outer shell 210 is thereby directed upward such that the direction of radiation is still upward as indicated by the arrow 617.

As the computing device 100 continues along its rotational path through to a tablet mode as depicted in FIG. 6D where the display device 520 of the upper half 516 and the input device 522 of the bottom half 518 are pointed away from each other, a torque force of gravity continues to draw the weighted portion 314 down such that the conductive pattern 212 is maintained in a single upward direction through the rotational positions of the upper half 516.

Thus, the present computing device 100 ensures a desired antenna position throughout the various rotational positions of the computing device 100. In this example, this is performed by weighting a portion of a freely-rotating outer shell 210 of a rotatable antenna 104 to ensure the direction of radiation is in a desired direction.

Figure 7:
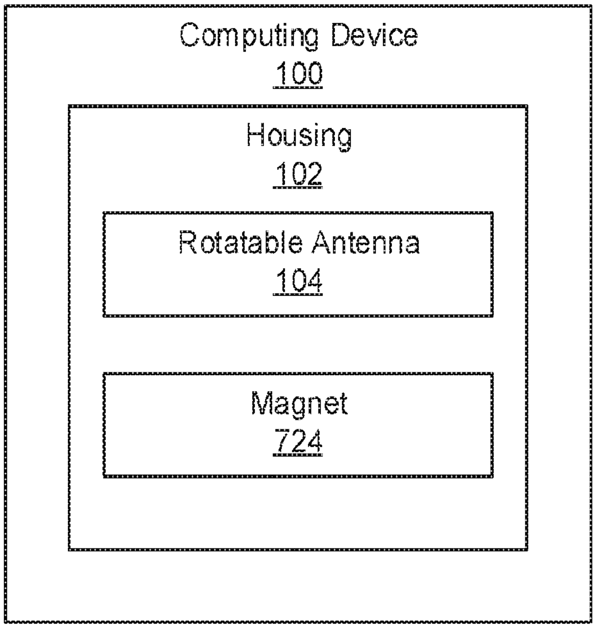
FIG. 7 is a block diagram of a computing device with a magnetized rotatable antenna and a magnet, according to an example.

FIG. 7 is a block diagram of a computing device 100 with a magnetized rotatable antenna 104 and a magnet 724, according to an example. That is, in this example, the computing device 100 includes the housing 102 as described above and the rotatable antenna 104. In this example, the rotatable antenna 104 is magnetized. More specifically, the rotatable antenna 104 may have a north pole and a south pole.

In this example, the computing device 100 includes a magnet 724 disposed in the housing 102. The magnet 724 rotates the rotatable antenna 104 when the rotatable antenna 104 is within a magnetic field of the magnet 724. That is, in this example, rather than being rotated by the force of gravity, the rotatable antenna 104 is rotated by a magnetic force.

In this example, the rotatable antenna 104 is rotatable to keep the direction of radiation pointed away from the housing 102. That is, antennas that are directed towards the housing 102 may have reduced performance as the housing 102 body as well as components within the housing 102 may impede the transmission and reception of RF waves. Accordingly, by ensuring that the direction of radiation is away from the housing 102, wireless communication is enhanced by reducing the effect of impeding bodies on the RF transmission.

Take as an example, when a laptop computer is in a closed position. In this example, were the rotatable antenna 104 to point upward, communication may be impeded by the lid of the laptop computer. Accordingly, a magnet 724 directs the rotatable antenna 104 away from the lid and instead directs it outward such that wireless communication is not impeded by the upper half of the computing device 100 nor the components found in the upper half.

Figure 8:
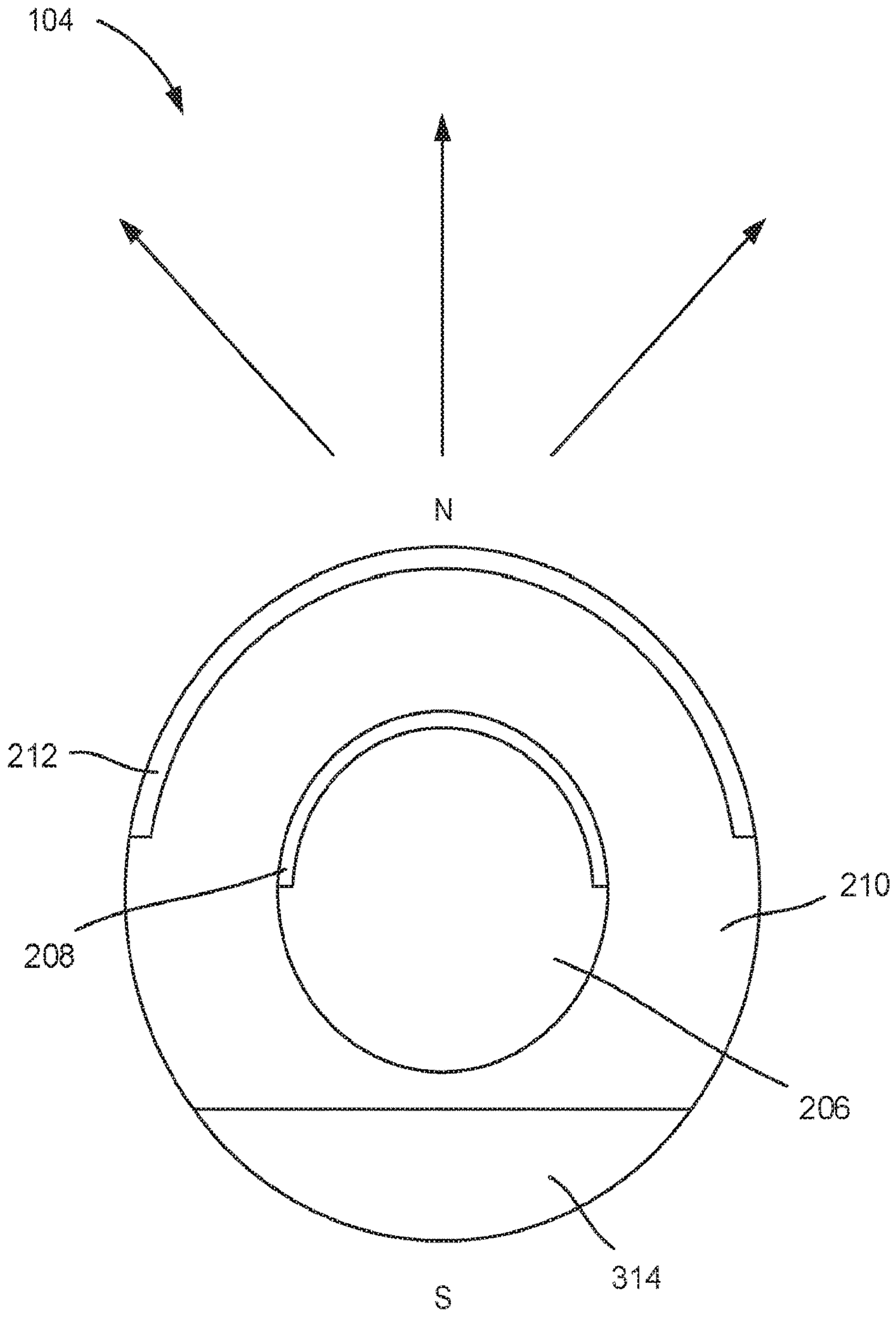
FIG. 8 is an end view of a magnetized rotatable antenna with a weighted portion, according to an example.

FIG. 8 is an end view of a magnetized rotatable antenna 104 with a weighted portion 314, according to an example. FIG. 8 clearly depicts the inner rod 206 with the excitation source 208 patterned thereon as well as the outer shell 210 with the conductive pattern 212 thereon. As described above, the direction of radiation may be normal to the conductive pattern 212 formed on the outer shell 210. In some examples, in addition to being magnetically polarized, the rotatable antenna 104 may include a weighted portion 314 to maintain a direction of radiation in a single direction when the rotatable antenna 104 is not within the magnetic field of the magnet 724. As described above, by virtue of the force of gravity on the weighted portion 314, when not in the presence of the magnetic field of the magnet 724, the conductive pattern 212 and direction of radiation is maintained in a single direction, which direction of radiation may be normal to the conductive pattern 212.

In some examples, the weighted portion 314 may have a magnetic polarization that is different than the magnetic polarization of the other portions of the rotatable antenna 104. That is, as described above, the weighted portion 314 may have a magnetic pole designated as a south pole, "S" and remaining portions of the outer shell 210 may have a magnetic pole designated as a north pole, "N". Once the magnet 724 is placed near the outer shell 210, the compelling force of the magnet 724 may rotate the outer shell 210 as the outer shell 210 is not fixed to the inner rod 206. Accordingly, as the outer shell 210 rotates, so does the conductive pattern 212 and the associated direction of radiation.

The weighted portion 314 may be magnetized in any variety of ways. For example, the weighted portion 314 may be doped with magnetic particles. In this example, the outer shell 210 may be formed by a dual-injection molded process. During one process, an ABS material is doped with the heavier material to form the weighted portion 314 and also with magnetic particles to magnetize the weighted portion 314. This heavier and magnetic fluid is injected into a mold, followed by injection of a less densely doped ABS without magnetic particles for remaining portions of the outer shell 210.

Figure 9:
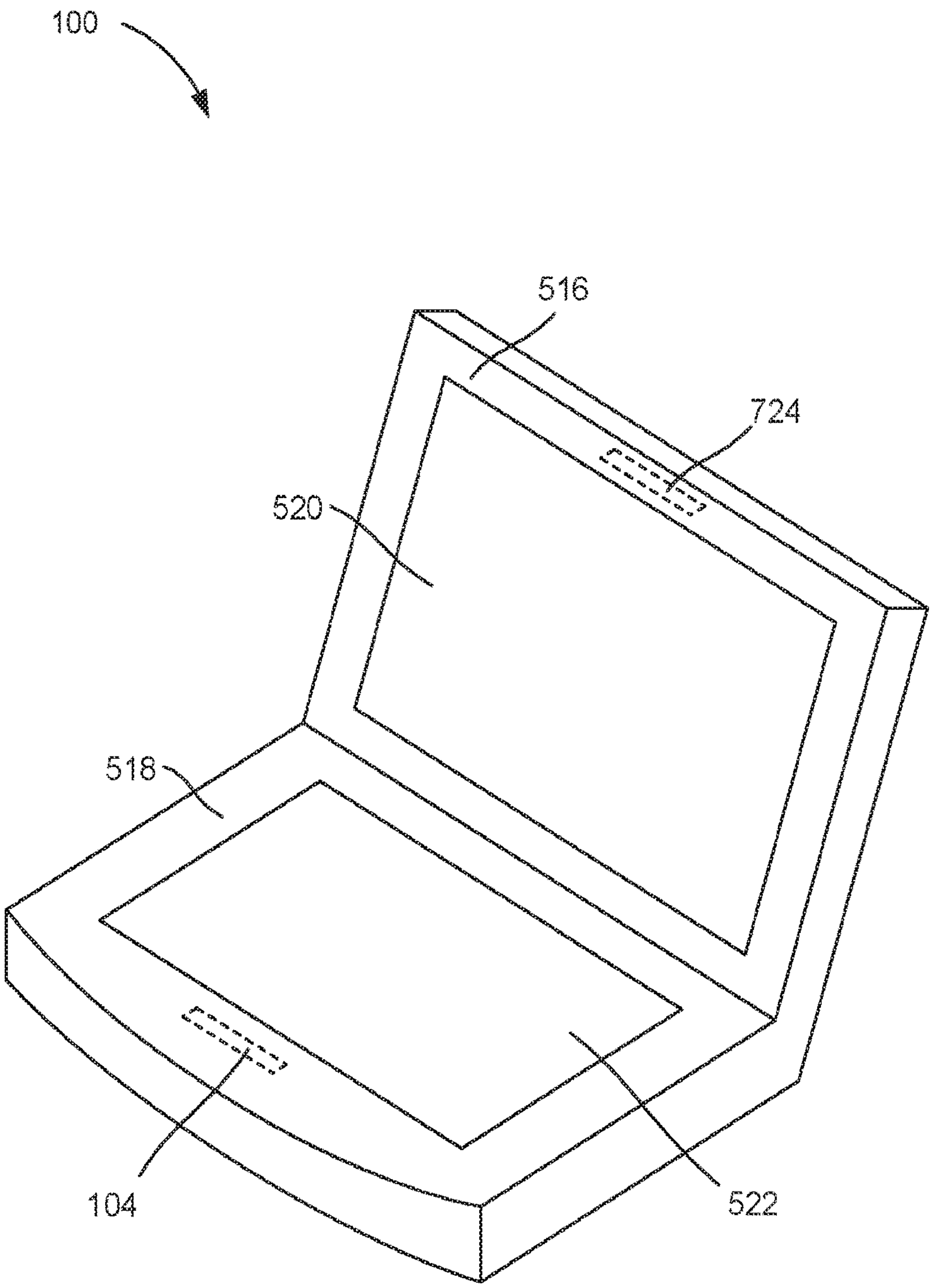
FIG. 9 is an isometric view of a computing device with a rotatable antenna, according to an example.

FIG. 9 is an isometric view of a computing device 100 with a rotatable antenna 104, according to an example. Specifically, FIG. 9 depicts an example where the housing 102 includes a bottom half 518 to house an input device 522 such as a keyboard and/or a touch sensitive surface. In this example, the housing 102 also includes an upper half 516 to house a display device 520.

In this example, the rotatable antenna 104 is disposed in the bottom half 518 of the housing 102. Note that while FIG. 9 depicts a single rotatable antenna 104, the computing device 100 may include any number of rotatable antennas 104 positioned at other locations within the computing device 100 housing 102.

As described above, the rotatable antenna 104 may be disposed within the housing 102. In FIG. 9, this is depicted by the rotatable antenna 104 being depicted in dashed lines indicating its position internal to the bottom half 518 of the housing 102. The rotatable antenna 104 may be coupled to the housing 102 via a rigid fixture. That is, the rotatable antenna 104 is coupled to the housing 102 via a fixture rigidly coupled to the housing 102 and the inner rod 206. In an example, a fixture such as clamps may receive the ends of the inner rod 206 of the rotatable antenna 104. Accordingly, the inner rod 206 may remain stationary relative to the housing 102. However, as described above, the outer shell 210 may rotate freely about the inner rod 206. Accordingly, at different points in time, the outer shell 210 may be in a different orientation relative to the inner rod 206 and housing 102. Specifically, the weighted portion 314 of the rotatable antenna 104 may rotate even as the bottom half 518 of the housing 102 remains stationary.

FIG. 9 also depicts the magnet 724 disposed in the upper half 516 of the housing 102. As with the rotatable antenna 104, the magnet 724 may be inside the housing 102 as indicated in FIG. 9 by the magnet 724 having a dashed outline. As described above, the magnet 724 in the upper half 516 compels/attracts the magnetized outer shell 210. This force may cause the outer shell 210 to rotate as the rotatable antenna 104 enters the magnetic field of the magnet 724, for example, as the upper half 516 of the computing device 100 is moved towards the bottom half 518 as when the computer is closed. Specifically, the magnet 724 rotates the conducive pattern 214 outward and away from the housing 102 such that transmitting and receiving performance is maintained. FIGS. 10A-10E depict the rotation of the upper half 516 of the housing 102 and the maintained radiation direction of the rotatable antenna 104.

Figure 10A:
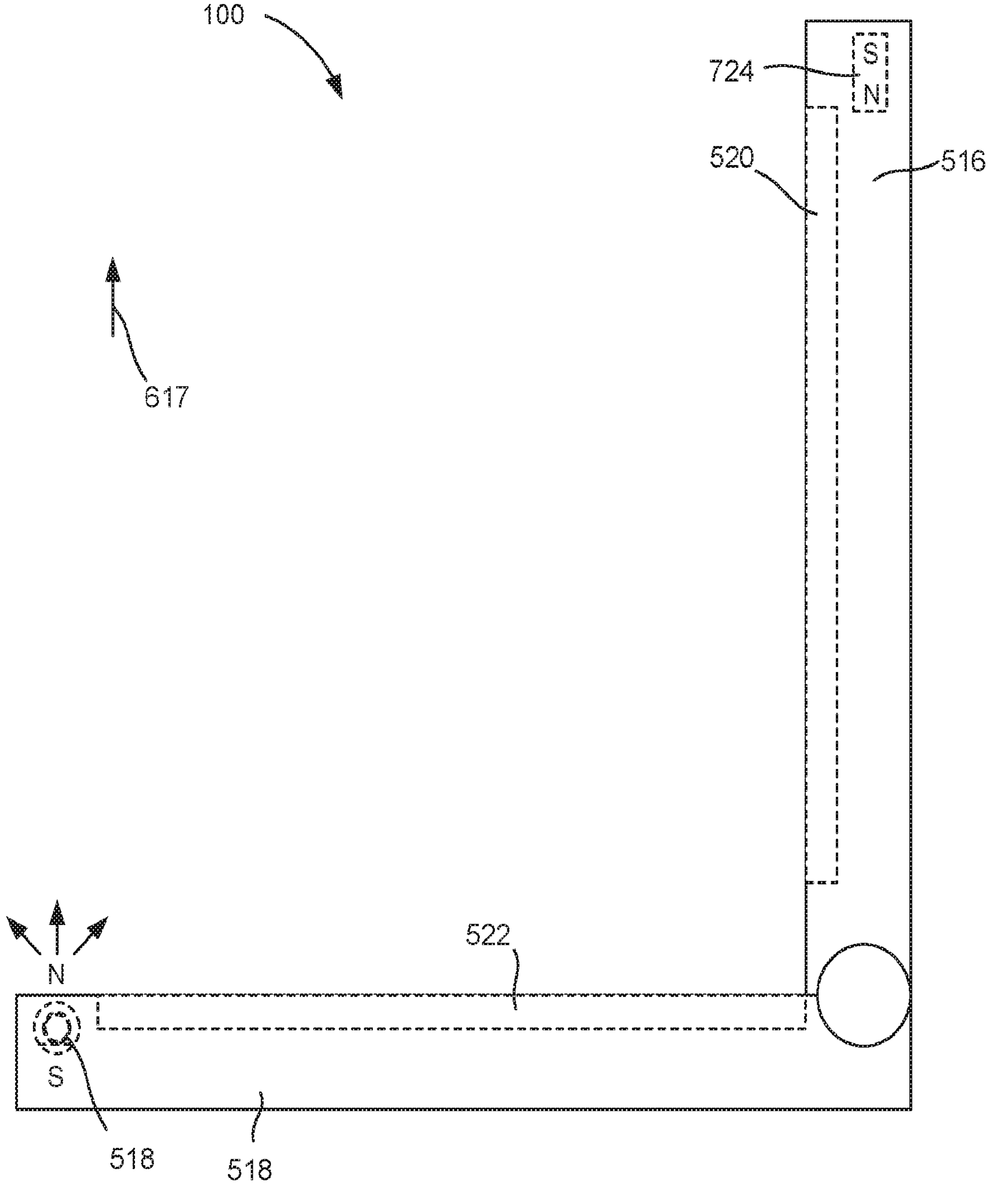
FIGS. 10A-10E depict a computing device with a magnetized rotatable antenna in various stages of rotation, according to an example.

FIGS. 10A-10E depict a computing device 100 with a magnetized rotatable antenna 104 in various stages of rotation, according to an example. As depicted in FIG. 10A, when in an open mode, the weighted portion 314 of the rotatable antenna 104, which may be on an opposite side of the outer shell 210 from the conductive pattern 212 is acted upon by the force of gravity which draws it down. The force of gravity on the weighted portion 314 causes the conductive pattern 212 to face upward, and thus radiate in an upward direction away from a surface of the earth as indicated by the arrow 617, which may be a desired direction.

Figure 10B:
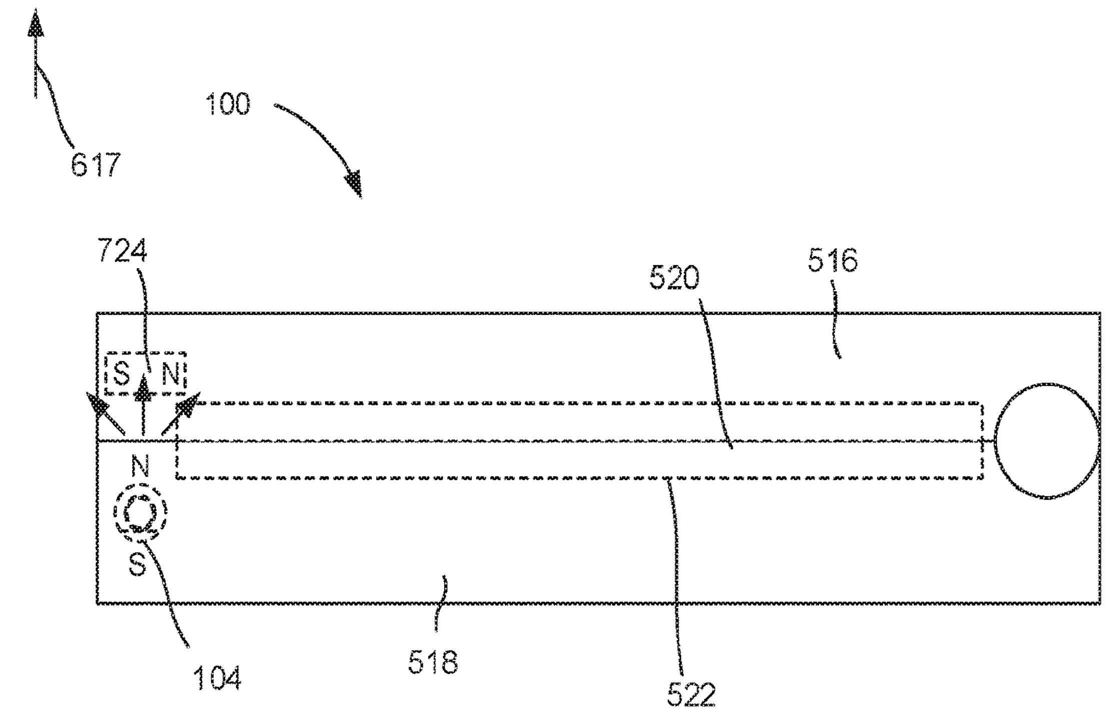
Figure 10C:
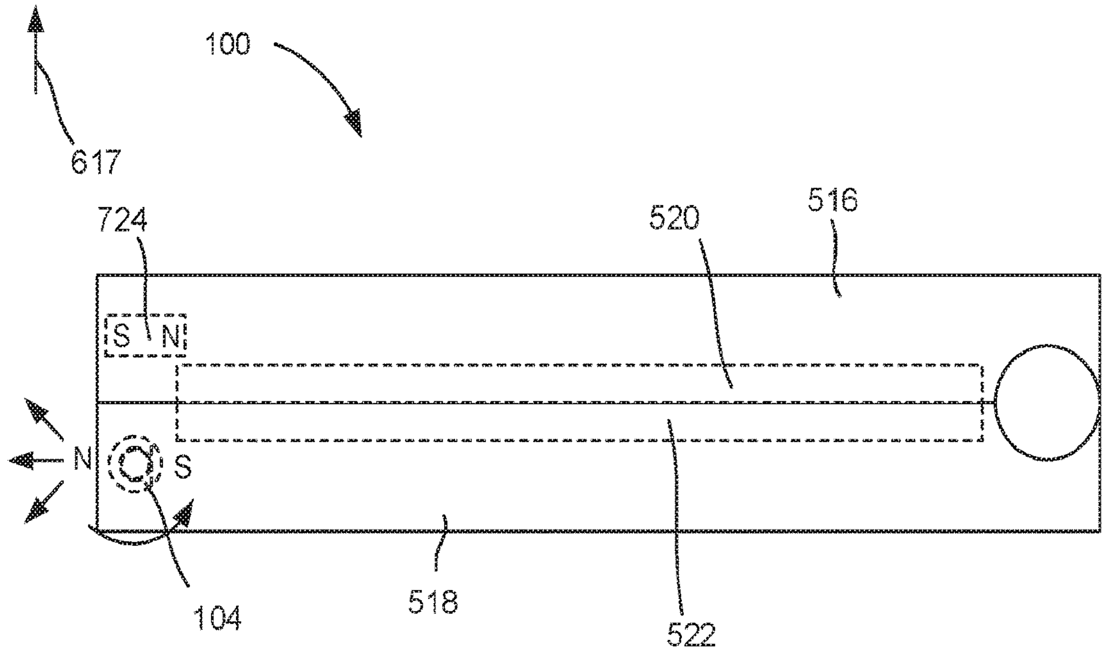

However, as depicted in FIG. 10B, when the upper half 516 is moved to be adjacent to the bottom half 518 with the input device 522 and display device 520 facing one another, such as when the computing device 100 is in a closed position, the components and body of the upper half 516 may block transmission of waves out of the rotatable antenna 104.

Accordingly, as depicted in FIG. 100, the magnetic field and orientation of the magnet 724 may compel the magnetized rotatable antenna 104 to rotate such that the radiation pattern of the conductive pattern 212 is away from the housing 102. Doing so may increase the strength of transmitted and received signals.

Figure 10D:
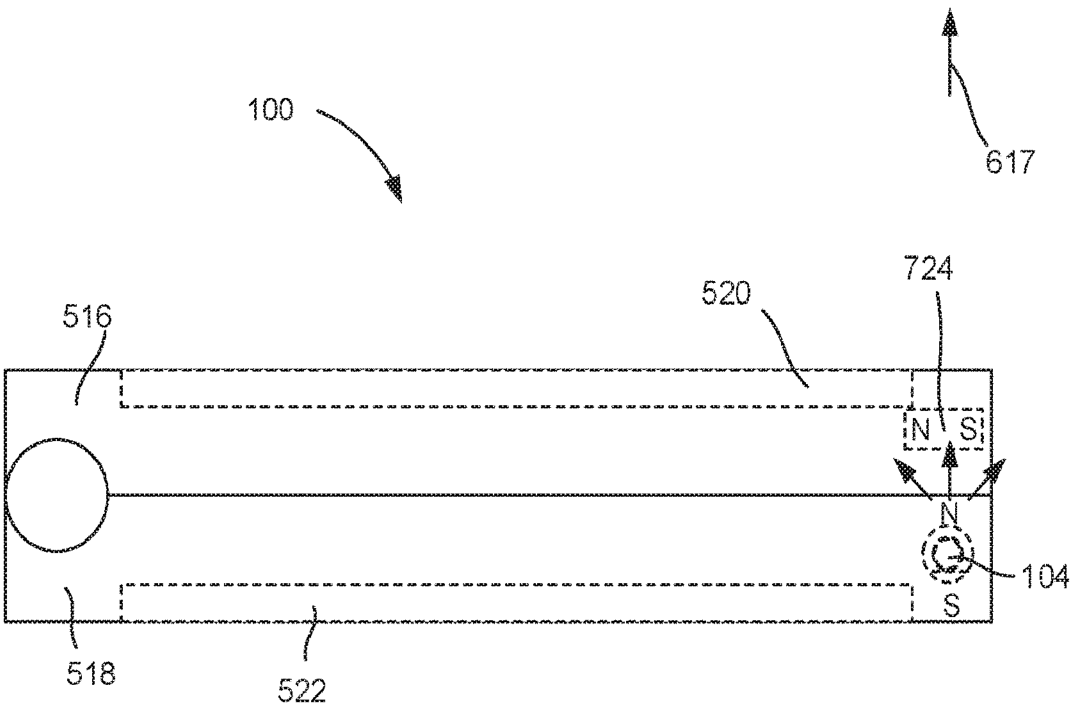
Figure 10E:
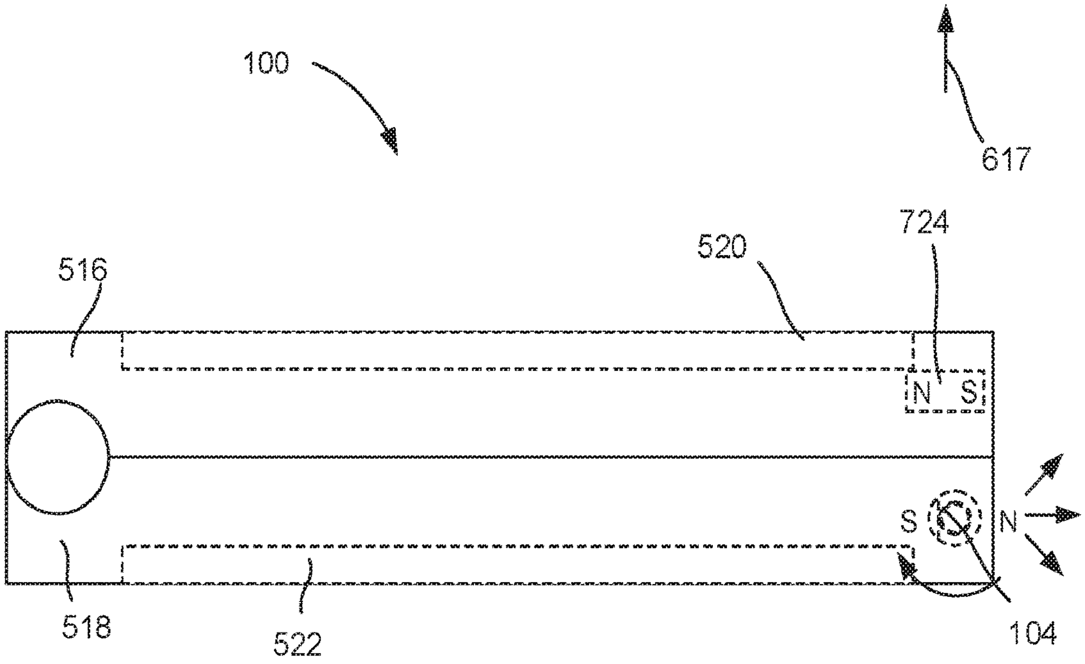

A similar effect is depicted in FIGS. 10D and 10E where the computing device 100 is in a tablet mode where the upper half 516 and the bottom half 518 are adjacent one another, but the display device 520 and the input device 522 are facing away from one another.

In this example, an upper half 516 of the computing device 100 may block transmission of waves out of the rotatable antenna 104 as depicted in FIG. 10D. However, due to the magnetic field and orientation of the magnet 724, the rotatable antenna 104 is rotated as indicated such that the radiation pattern of the conductive pattern 212 is away from the housing 102 as depicted in FIG. 10E. Doing so may increase the strength of transmitted and received signals. Accordingly, as depicted in FIGS. 10A-10E, when the housing 102 is in an open position such as that depicted in FIG. 10A, the weighted portion 314 is to maintain the direction of radiation in a direction opposite gravity. However, when the housing 102 is in a closed position such as depicted in FIG. 100 and in a tablet position such as depicted in FIG. 10E, the magnet 724 rotates the direction of radiation away from the housing 102.

What is claimed is:

1. A computing device, comprising:
- a housing; and
- a rotatable antenna disposed within the housing, wherein the rotatable antenna comprises:
- an inner rod with an excitation source,
- an outer shell to surround the inner rod, and
- a conductive pattern formed on an outside surface of the outer shell to emit radio frequency (RF) waves in a direction normal to the conductive pattern,
- wherein the rotatable antenna is to rotate such that a direction of radiation is maintained in a single direction as the housing is to rotate.

2. The computing device of claim 1, wherein the excitation source and the conductive pattern are laser direct structuring (LDS) antennas on a plastic body.

3. The computing device of claim 1, wherein the conductive pattern has an inset to increase impedance.

4. The computing device of claim 1, wherein the rotatable antenna is coupled to the housing via a fixture rigidly coupled to the housing and the inner rod.

5. A computing device, comprising:
- a housing; and
- a rotatable antenna disposed in the housing, wherein the rotatable antenna comprises:
- an inner rod with an excitation source,
- an outer shell to surround the inner rod, and
- a conductive pattern formed on an outside surface of the outer shell to emit radio frequency (RF) waves in a direction normal to the conductive pattern,
- wherein the rotatable antenna is to rotate such that a direction of radiation is maintained in a single direction as the housing is to rotate; and
- a weighted portion of the rotatable antenna to maintain the direction of radiation in the single direction as the housing is to rotate.

6. The computing device of claim 5, wherein the weighted portion is doped with a metal material heavier than remaining portions of the rotatable antenna.

7. The computing device of claim 5, wherein material of the weighted portion is a different material than remaining portions of the rotatable antenna.

8. The computing device of claim 5, wherein the weighted portion:
- is formed in the outer shell which is to rotate freely about the inner rod of the rotatable antenna; and
- is formed on an opposite side of the outer shell from conductive pattern.

9. The computing device of claim 5, wherein:
- the housing comprises a bottom half to house an input device and an upper half to house a display device; and
- the rotatable antenna is disposed in the upper half of the housing; and
- the weighted portion of the rotatable antenna is to maintain the direction of radiation in the single direction as the upper half of the housing is to rotate.

* * * * *